E. B. ELDER.
AUTOMATIC WEIGHING MECHANISM.
APPLICATION FILED DEC. 16, 1920.
1,421,926.
Patented July 4, 1922.
5 SHEETS—SHEET 1.
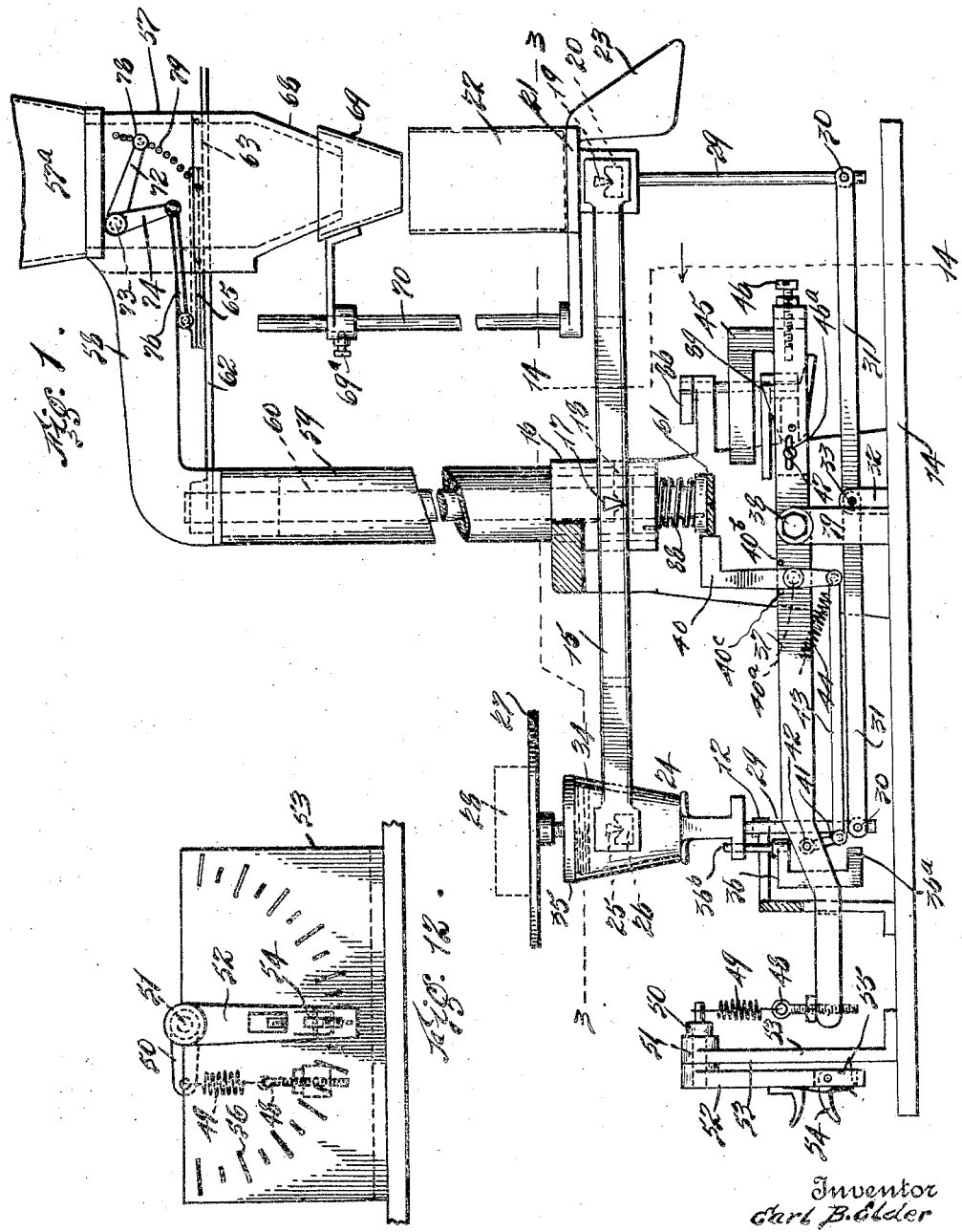

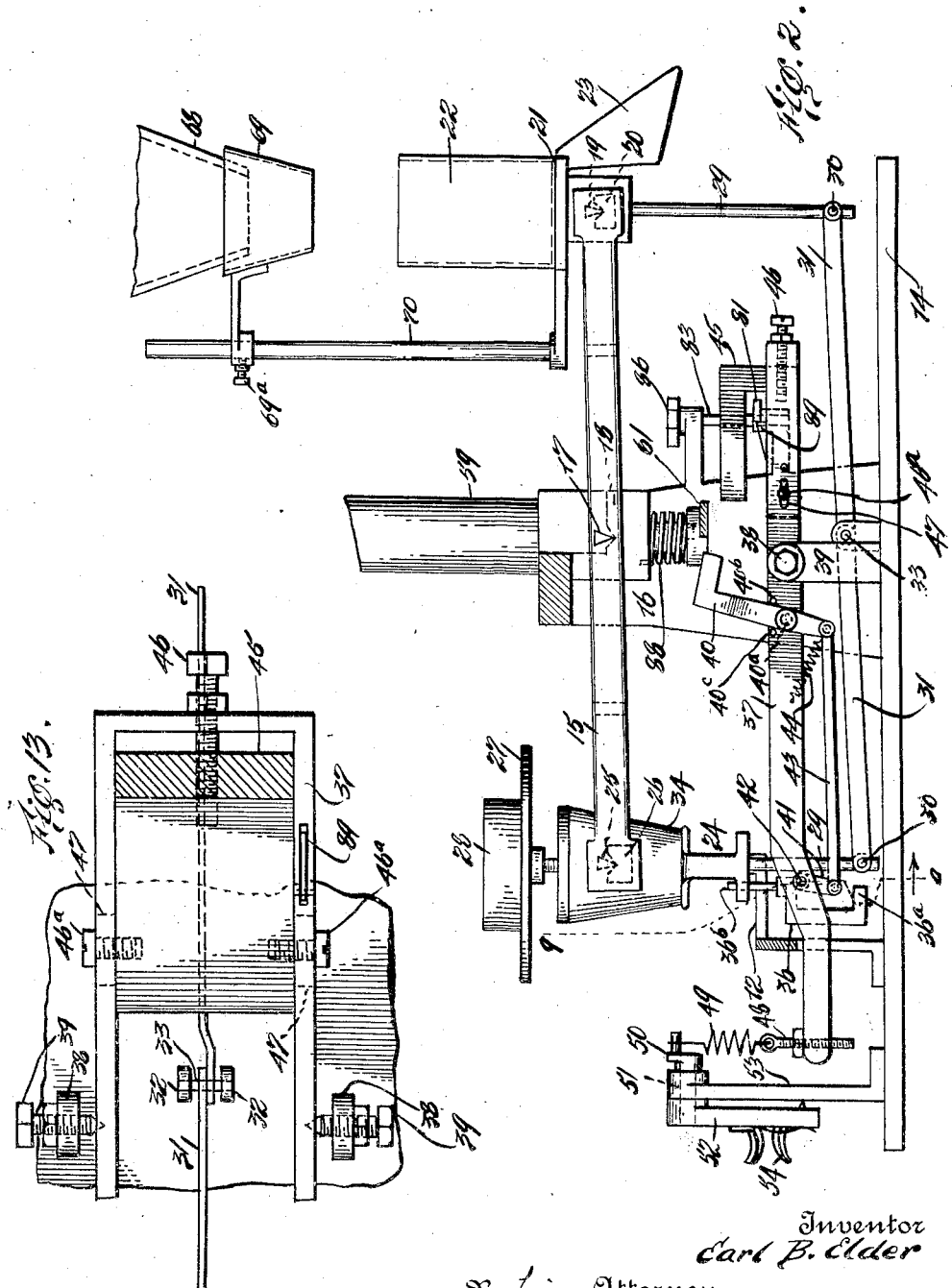

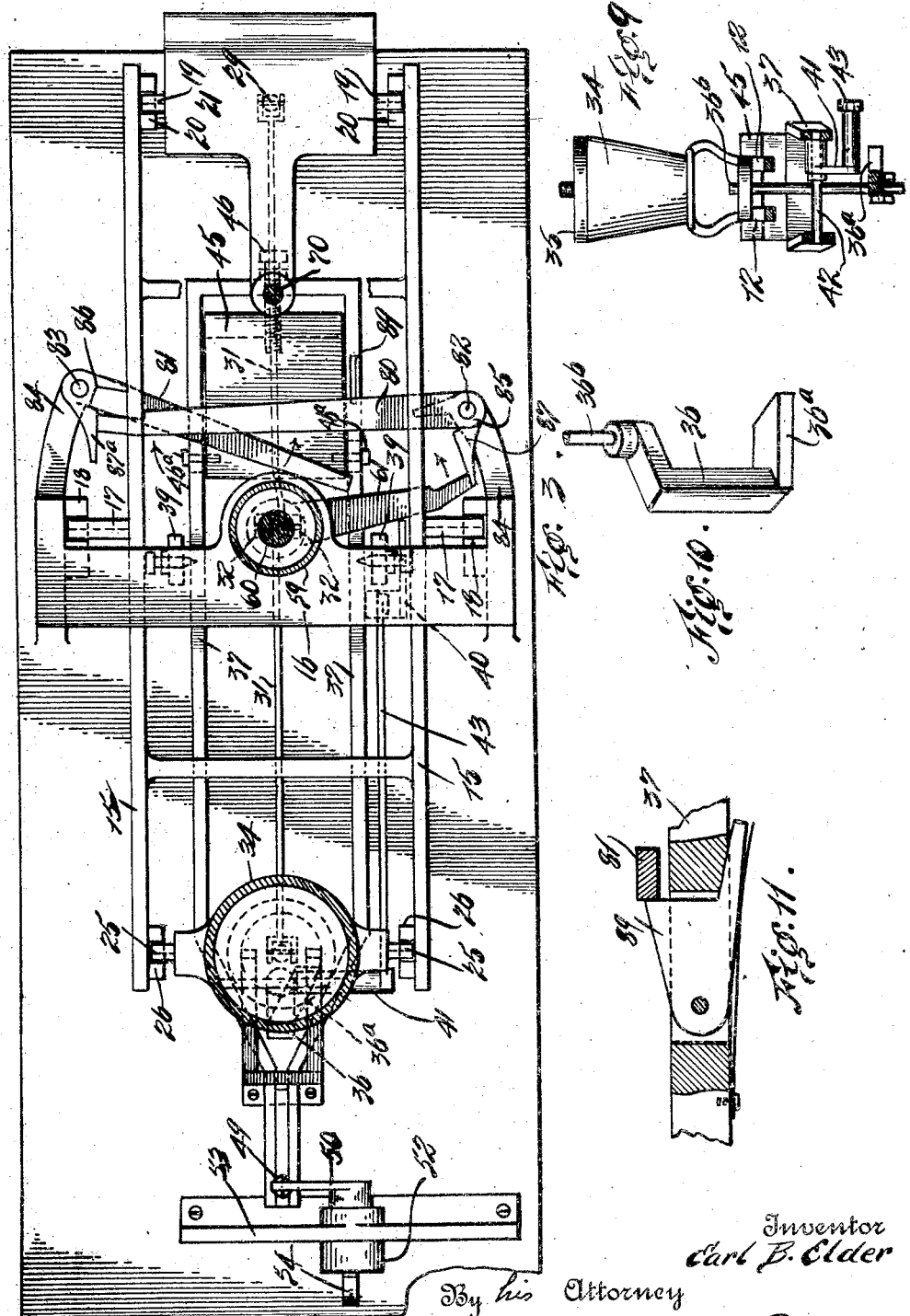

E. B. ELDER.
AUTOMATIC WEIGHING MECHANISM.
APPLICATION FILED DEC. 16, 1920.
1,421,926.
Patented July 4, 1922.
5 SHEETS—SHEET 4.
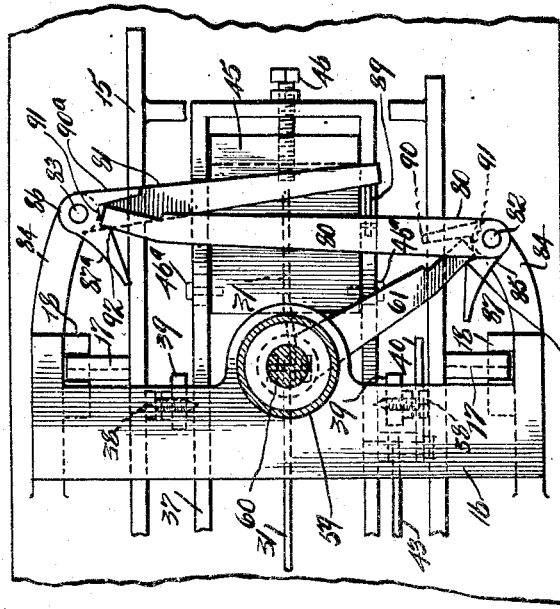
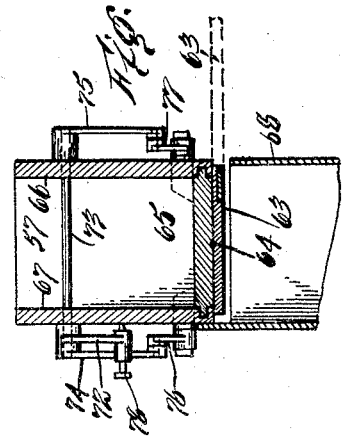
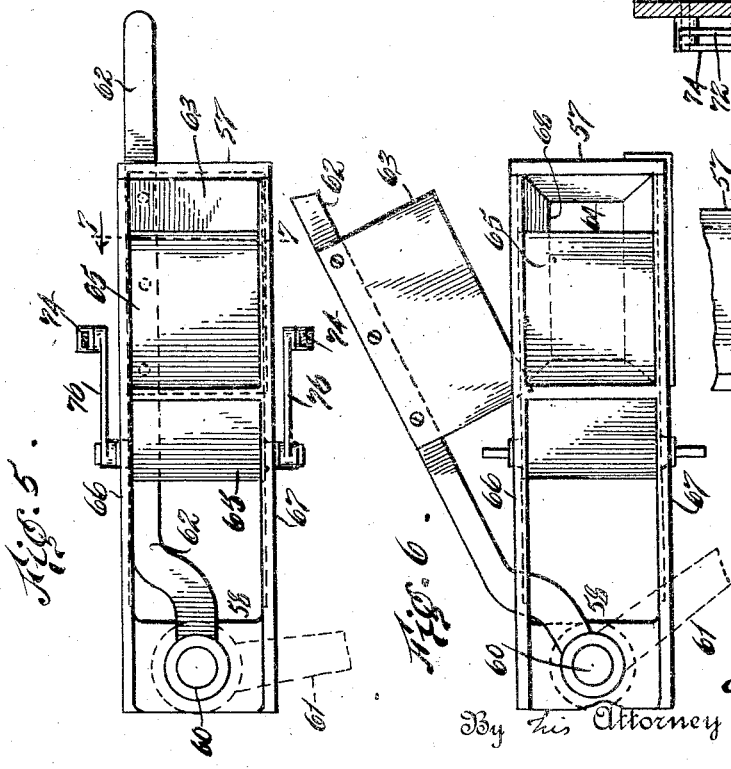
Inventor
Carl B. Elder
By his Attorney
P. F. Bourne

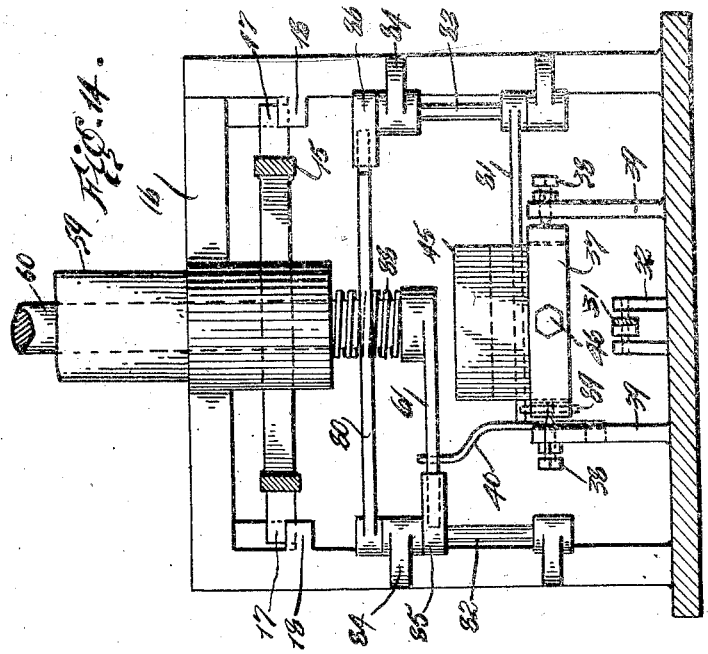

UNITED STATES PATENT OFFICE.

EARL B. ELDER, OF NEW YORK, N. Y., ASSIGNOR TO E. D. ANDERSON, INC., OF NEW YORK, N. Y., A CORPORATION OF NEW YORK.

AUTOMATIC WEIGHING MECHANISM.

1,421,926.           Specification of Letters Patent.       Patented July 4, 1922.

Application filed December 16, 1920. Serial No. 431,093.

*To all whom it may concern:*

Be it known that I, EARL B. ELDER, a citizen of the United States, and resident of New York city, borough of Manhattan, in the county of New York and State of New York, have invented certain new and useful Improvements in Automatic Weighing Mechanism, of which the following is a specification.

My invention relates to improvements in weighing machines, and although my improvements may be used as a testing scale or for ordinary weighing, one of the objects of my invention is to provide means for automatically cutting off the supply of material to be weighed and packed when the requisite amount has passed from its supply source for each package.

My invention comprises novel details of improvement that will be more fully hereafter set forth and then pointed out in the claims.

Reference is to be had to the accompanying drawings forming part of this application, wherein—

Fig. 1 is a partly sectional side elevation of a weighing machine, the parts being in position for operation as a test scale or for ordinary weighing; Fig. 2 is a similar view illustrating the parts in position for automatic operation; Fig. 3 is a partly sectional plan view substantially on the plane of the line 3, 3 in Fig. 1; Fig. 4 is a fragmentary plan view of parts shown in Fig. 3 set for automatic operation; Fig. 5 is an enlarged plan view illustrating the supply receptacle or hopper for the material to be weighed, illustrating and showing the gate in cut-off position as in Fig. 1; Fig. 6 is a view similar to Fig. 5 illustrating the gate in the open position. Fig. 7 is a vertical section on the line 7, 7 in Fig. 5; Fig. 8 is a fragmentary front view of Fig. 5; Fig. 9 is a vertical section on line 9, 9 in Fig. 2; Fig. 10 is a detail perspective view illustrating the yoke of the pre-tripping device; Fig. 11 is an enlarged detail illustrating a latch of the pre-tripping device; Fig. 12 is a detail side-view looking from the left hand side of Fig. 1; Fig. 13 is an enlarged fragmentary plan view of the weighted end portion of the pre-tripping lever or frame, and Fig. 14 is an enlarged sectional view on the line 14, 14 in Fig. 1.

Similar numerals of reference indicate corresponding parts in the several views.

While my improvements may be embodied in a scale mechanism of any approved form of the balanced beam variety, I have illustrated the scale mechanism comprising a base 14 provided with a pedestal 16 supporting beam 15 by means of knife edges 17, 18, which may be of usual construction used in weighing scales. At one end beam 15 supports a plate or pan 21 by means of bearings 19, 20, and which is weighted as shown at 23 to approximately balance a post 24 at the opposite end of the beam. Said post is shown pivotally supported on beam 15 by bearings 25, 26. The plate or pan 21 is adapted to support the receptacle 22 to be charged. The post 24 supports a plate or the like 27 adapted to receive one or more weights 28, to counterbalance the receptacle 22 and the material to be weighed. The pan 21 and the post 24 are shown provided with depending rods 29 each pivotally connected at 30 with a lever 31 that is pivotally supported at 33 upon an up-right 32 extending from base 14, whereby plate or pan 21 and post 24 are maintained in proper position during movements of beam 15, the pivots 17 and 33 being in vertical alignment. As illustrated, the post 24 comprises a hollow head 34 in which lead or other material may be placed to cause beam 15 to balance accurately. Head 34 is shown provided with a cover 35 which carries the plate 27. Post 24 supports a yoke 36 to coact with pre-tripping devices, comprising a lever or frame 37 pivoted at 38 on an upright 39, extending from base 14, and a lever 40 pivotally connected at 40ᵃ to lever 37. A member or hanger 41 is pivotally carried by lever 37 and is pivotally connected by link 43 with lever 40, said member and lever serving as controlling means for the pre-tripping device in connection with beam 15 by co-operation of member 41 with yoke 36. A spring 44 connecting lever 40 with lever 37 tends to swing lever 40 and member 41 from the position shown in Fig. 1 to the position shown in Fig. 2, stops 40ᵇ and 40ᶜ on lever 37 on opposite sides of lever 40 limiting the swinging or tilting of the latter lever. When lever 40 is retained in the position shown in Fig. 1 the member or hanger 41 will be out of register with a lateral projection 36ª of yoke 36, (Figs. 1, 9, and 10), and when lever 40 is in the position shown in Fig. 2 said member or hanger 41 will be in position over projection 36ª, (Fig. 2). As shown in Fig. 9, member 41 is positioned at one side of the supporting rod 36ᵇ of yoke 36, said rod being suitably secured to post 24. A stop 12 on base 14 is in position to be engaged by post 24 to limit the downward movement of beam 15 under the influence of weight 28. The lever 37 is shown provided with a weight 45 adjacent to the end opposite member 41, which weight may be shifted along said lever by means of an adjusting screw 46, screws 46ª adjustable in slots 47 of lever or frame 37 serving to secure said weight in set position on lever 37. The weight 45 may be adjusted to balance the pre-tripping lever 37. At the opposite end of lever 37 an adjusting screw 48 is shown which is attached to spring 49, the opposite end of said spring being attached to an arm 50 carried by a shaft 51, having an arm 52. Shaft 51 is journaled upon a bracket 53 carried by base 14. Arm 52 is shown provided with a latch 54 having a projection 55 adapted to engage recesses or indentations 56 in bracket 53, (Figs. 1 and 12). The tension of spring 49 may be adjusted by shifting arm 50 and retaining the latter in set position.

When the parts are in the positions shown in Fig. 2, the scale mechanism so far described may be used as a test scale or for ordinary weighing by manually inserting the goods to be weighed in the receptacles 22 placed upon the pan 21. For automatic weighing I provide a supply receptacle or hopper for the goods to be weighed and a gate for the hopper, with devices co-operative between the gate and the pre-tripping mechanism for causing automatic closing of the gate when the requisite amount of goods has passed from the hopper. Above pan 21 is located chamber 57 to receive the material to be weighed from the hopper or receptacle 57ª, into which the material may be dumped in bulk. Said chamber and receptacle are shown supported by an arm 58 extended from a hollow column 59 carried by pedestal 16. A shaft 60 is journaled in column 59, the lower end of which shaft carries an arm 61 adapted to co-operate with lever 40 and the upper end of shaft 60 carries an arm 62 supporting the gate or cut-off 63. Said gate or cut-off is arranged to close and open the outlet 64 of chamber 57, (Fig. 6). The gate 63 is shown adapted to operate laterally at the lower end of chamber 57, (Figs. 7 and 8). The size of outlet opening 64 may be regulated or controlled by a valve plate 65, slidably mounted in the walls 66 and 67 of chamber 57, (Fig. 7). Beneath outlet 64 and valve 65 is shown a spout or chute 68, adapted to direct the material to be weighed to the receptacle 22, preferably through a funnel 69, carried by a post 70 on pan or plate 21. The funnel may be adjusted by means of screw 69ª, (Fig. 1). The valve 65 may be adjusted with respect to outlet 64 of chamber 57 and retained in set position to control the flow of material from said chamber by means of an arm 72 supported by shaft 73 journaled on chamber 57, arms 74, 75 on said shaft being connected by links 76, 77 with valve plate 65. Arm 72 may be retained in set position by means of a latch 78 adapted to engage recesses 79 in the adjacent wall of chamber 57 to retain the valve 65 in set position.

For automatic weighing the arm 61 is controlled by retaining and releasing devices that are controlled by the pre-tripping lever 37, the arrangement illustrated for such purposes being as follows: Arms 80 and 81 are respectively carried by shafts 82 and 83, journaled in bearings 84 on pedestal 16 supporting said shafts, (Fig. 14). Shafts 82 and 83 respectively carry latch members 85, 86, the latch member 85 being co-operative with arm 61 and the latch member 86 being co-operative with arm 80, (Fig. 4). When gate 63 is closed and arm 61 engages lever 40, as in Fig. 1, the arm 61 also engages the extending member 87 of latch 85 to cause arm 80 to engage the extending member 87ª of latch 86 to cause arm 81 to be in a position retracted from a spring controlled latch 89 on lever or frame 37, (Fig. 3), for the non-automatic position of the parts that control the gate 63. In such position of the parts a spring 88, shown coiled around shaft 60 and secured at one end to said shaft and at the other end to pedestal 16, (Figs. 1 and 2), will tend to retain arms 61, 80 and 81 in set position, (Fig. 3), the tendency of spring 88 being normally to close and hold gate 63 closed at outlet 64ª of chamber 67, as indicated in Fig. 5. When gate 63 is opened, as to the position shown in Fig. 6, the arm 61 will be moved away from lever 40 to release the latter and said arm will engage the projection 90 of latch member 85 to rotate arm 80 from the position shown in Fig. 3 to the position shown in Fig. 4, said arm 80 engaging the projection 90ª of latch 86 to cause arm 80 to move into retained engagement with latch 90, (Figs. 2, 4 and 11). When the parts are in the last named position the gate 63 will be retained open and lever 40 will be free from arm 61 so that the pre-tripping devices may operate in conjunction with the operation of beam 15, to cause automatic release and closing of gate 63 when the requisite amount of material for a charge in a receptacle 22 has passed from chamber 57.

When the scale is to be used as a test scale or for ordinary weighing the gate 63 will be closed whereupon arm 61 will engage lever 40 causing the latter to withdraw member 41 from over projection 36ª of yoke 36, and the pre-tripping lever 37 will be maintained from rotation, whereby beam 15 may rock for weighing without interference of member 41 with yoke 36. The goods to be weighed may be manually dumped into receptacle 22 on pan 21 in an ordinary manner. When the machine is to be used for automatic weighing gate 63 is closed, the material to be weighed is placed in bulk in receptacle or hopper 57ª, receptacle 22 is placed upon beam 21 and suitably counterbalanced by a weight on plate 27, or in any desired manner, and the appropriate weight 28 is placed on plate 27 according to the amount of material to be charged into the receptacle 22. Gate 63 is next opened whereupon arm 61 is moved away from lever 40, permitting the latter to be tilted by the operation of spring 44, causing member 41 to be moved to present its lower part over projection 36ª of yoke 36, (Fig. 2), and arm 61 will cause arms 80 and 81 to be operated to engage arm 81 with latch 89 on pre-tripping lever or frame 37, (Figs. 2, 4 and 11). Gate 63 is thereby temporarily retained open and the material will flow from chamber 57 into receptacle 22, causing beam 15 to tilt. When the parts are in the position for automatic weighing the shaft 42 of member 41 will engage the upper part of yoke 36, the tension of spring 49 tending to tilt pre-tripping lever 37. As beam 15 is tilted by reason of the weight of the material entering receptacle 22 on pan 21 the pre-tripping lever 37 will correspondingly tilt under the influence of spring 49 and the rising of yoke 36, until latch 89 releases arm 81, which, by reason of catch portion 92ª of latch 87ª has retained arm 80, the latter, by reason of catch 92 of latch 87, having retained arm 61 against the tension of spring 88, whereby gate 63 has been retained open. The release of arm 81 from latch 89 causes the release of arms 80 and 61, spring 88 thereupon causing rotation of shaft 60 to cause closing of gate 63 to cut off the flow of material from the hopper, and arm 61 engages lever 40 causing the latter to tilt to withdraw member 41 from over projection 36ª of yoke 36, the parts thereby being restored to the non-automatic position. The lever 40 by engaging the stop pin 40° of lever 37 causes the latter, under the influence of spring 88 acting through arm 61 on lever 40, to tilt back to normal position against the tension of spring 49. The latch 89 will, by reason of the last named movement of lever 37, be restored to position to again be engaged by arm 81 for a subsequent automatic weighing operation. The pre-tripping devices operate to cause automatic closing of gate 63 before the full amount of the required charge has been deposited in receptacle 22 and while some of such material is passing from the hopper to the receptacle. During automatic operation the spring 49 exerts an upward force upon the weighted end of scale beam 15 equal to the weight of the material in the air falling between gate 63 and the level of the material in receptacle 22 at the moment the gate closes, such material continuing to flow into the receptacle. The required tension of spring 49 with respect to lever 37 may be determined by trial with respect to the character of goods to be weighed, and when once determined for such material the latter may be weighed, and charged in successive receptacles, so that with the supply receptacle 57ª charged with the material it is merely necessary to place successive receptacles upon pan 21 and open the gate 63 after each receptacle has been placed on said pan, since the gate will automatically close and shut off the continued flow of material when the proper amount of material has been cut off for each receptacle. If the gate did not close until the proper weight of material for a receptacle had been delivered therein, say one pound, all the material in the air between the level of the material in the receptacle and the gate would flow into the receptacle, hence more than a pound would be delivered therein. To obviate such objection the spring 49 co-operates through lever 37 and yoke 36 with beam 15 to aid the tilting of the latter, under the weight of the material thereon, to an extent equal to the weight of the material in the air between the gate and the material in the receptacle to cause release of arm 81 at the proper moment before the full charge has been deposited in the receptacle. If, for example, it be desired to weigh one pound of material in each receptacle, and if it should be ascertained that the material remaining in the air after the gate closed weighed one-quarter of a pound, said gate would automatically close when three-quarters of a pound of material had been delivered into the receptacle. The tension of spring 49 being equivalent to one-quarter of a pound on the scale pan, added to the three-quarters of a pound of material in the receptacle on the pan, causes sufficient tilting of beam 15 and lever 37 to release arm 81 from latch 79 to close the gate 63 while the one-quarter of a pound of such material remains in the air between the gate and the material in the receptacle, the continued flow of such material into the receptacle making no difference in the weighing operation. In other words, if a pound weight were on a plate 27 the scale would balance, by reason of the tension of spring 49, when three-quarters of a pound of material had entered the receptacle on pan 21, whereupon gate 63 would close, leaving one quarter of a pound of the material in the air to enter the receptacle. In case the latch 89 should not release arm 81, during an automatic operation, (as by reason of corrosion or from other causes), gate 63 would not close at the proper moment and the material would continue to flow from the hopper until a sufficient amount thereof entered the receptacle or flowed over on pan 21 to overweight beam 15 and cause excess tilting thereof. Such tilting of beam 15 will cause yoke 36 to rise sufficiently to engage its projection 36$^a$ with member 41 and sufficient flow of material on pan 21 will so overbalance beam 15 that projection 36$^a$ will bear on the member 41 (Fig. 2) with sufficient force to tilt lever 37 and cause latch 89 to release arm 81, to permit closing of gate 63. Under such conditions, although some of the material will flow from the hopper the remainder will be prevented from flowing therefrom. The construction described assures the release of lever 81 in case the same should be retained by latch 89, notwithstanding an excess discharge of some material from the hopper results.

Having now described my invention, what I claim is:

1. A weighing machine comprising balancing mechanism, a supply receptacle for material, a gate to control the flow therefrom, means tending to close the gate, means to retain the gate open, devices operative with the balancing mechanism to release the retaining means before a full charge from said supply receptacles has been deposited on the balancing mechanism, the said devices including operating means to actuate the balancing means before said full charge has been deposited thereon, and devices cooperative between the gate and said first named devices to render the latter inoperative with the balancing mechanism whereby the balancing mechanism may operate independently of said gate.

2. A weighing machine comprising balancing mechanism, a supply receptacle for material, a gate to control the flow therefrom, means tending to close the gate, means to retain the gate open, and devices cooperative between the balancing means and the retaining means to control the latter by the former, means operative with the retaining means to cause the latter to urge the balancing means, and means to cause the balancing means to move the retaining means to release the gate in case more than a full charge flows from the supply receptacle.

3. A weighing machine comprising balancing mechanism, a supply receptacle for material, a gate to control the flow therefrom, means tending to close the gate, means to retain the gate open, and devices cooperative between the balancing means and the retaining means to control the latter by the former, means operative with the retaining means to cause the latter to urge the balancing means, and means to cause the balancing means to move the retaining means to release the gate in case more than a full charge flows from the supply receptacle, and devices controlled by the gate in its closed position to render the retaining means inoperative whereby the balancing means may operate independently of the retaining means.

4. A weighing machine comprising balancing mechanism, a receptacle for material, a gate to control the flow therefrom, means tending to close the gate, a lever cooperative with the balancing mechanism, retaining means cooperative between said lever and gate to retain the latter open, a movable member carried by the lever to cooperate with the balancing mechanism, and means cooperative between said member and the gate to retain said member out of operative relation to the balancing mechanism when the gate is closed.

5. A weighing machine comprising balancing mechanism, a receptacle for material, a gate to control the flow therefrom, means tending to close the gate, a lever cooperative with the balancing mechanism, retaining means cooperative between said lever and gate to retain the latter open, a movable member carried by the lever to cooperate with the balancing mechanism, a lever carried by the first named lever and connected with said member, and an arm connected with said gate to control said second named lever when the gate is closed.

6. A weighing machine comprising balancing mechanism, a receptacle for material, a gate to control the flow therefrom, means tending to close the gate, a lever cooperative with the balancing mechanism, retaining means cooperative between said lever and gate to retain the latter open, cooperative means between the gate and the lever to render the latter inoperative when the gate is closed, and means connected to said lever to cause the latter to actuate said balancing mechanism.

7. A weighing machine comprising balancing mechanism, a receptacle for material, a gate to control the flow therefrom, means tending to close the gate, a lever cooperative with the balancing mechanism, retaining means cooperative between said lever and gate to retain the latter open, cooperative means between the gate and the lever to render the latter inoperative when the gate is closed, means connected to said lever to cause the latter to actuate said balancing mechanism, and means to vary the power of said last named means.

8. A weighing machine comprising balancing mechanism, a supply receptacle for material, a gate to control the flow therefrom, means tending to close the gate, a lever operative with the balancing mechanism in one direction of movement, said lever having a movable member to cooperate with said balancing mechanism to be operated thereby, means to urge the lever toward the balancing mechanism, means operative between said lever and gate to control said member, and retaining means controlled by said lever to retain the gate open.

9. A weighing machine comprising balancing mechanism, a supply receptacle for material, a gate to control the flow therefrom, means tending to close the gate, a lever operative with the balancing mechanism in one direction of movement, retaining devices to retain the gate open, latch means on said lever operative with said retaining devices to retain and release the gate, and means to operate said lever.

10. A weighing machine comprising balancing mechanism, a supply receptacle for material, a gate to control said supply, an arm connected with the gate, means to close the gate, a lever, latch means between the lever and arm to control the latter, means connected with the lever to cause the latter to urge the balancing mechanism, and movable means connected with said lever for actuation by the balancing mechanism when the gate is open, said movable means being retained out of operative relation to the balancing mechanism when the gate is closed.

11. A weighing machine comprising balancing mechanism, a supply receptacle for material, a gate to control said supply, an arm connected with the gate, means to close the gate, a lever, a movable member connected with the lever, a lever connected with said member and pivoted on the first named lever, said second named lever being adapted to cooperate with said arm when the gate is closed to retain said member out of operative relation to the balancing mechanism.

12. A weighing machine comprising balancing mechanism, a supply receptacle for material, a gate to control said supply, an arm connected with the gate, means to close the gate, a lever, a movable member connected with the lever, a second lever connected with said member and pivoted on the first named lever, said second named lever being adapted to cooperate with said arm when the gate is closed to retain said member out of operative relation to the balancing mechanism, and latch means between said arm and first named lever to retain the gate open.

13. A weighing machine comprising a beam having means to support articles to be weighed, a supply receptacle for material, a gate to control said supply, means to close the gate, an arm connected with the gate, a lever means to urge the lever to operate the beam, and latch means cooperative with said arm and lever to retain the gate open.

14. A weighing machine comprising a beam having means to support articles to be weighed, a supply receptacle for material, a gate to control said supply, means to close the gate, an arm connected with the gate, a lever, means to urge the lever to operate the beam, a latch upon the lever, and interengaging arms and catches cooperative with said latch and first named arm to retain the gate open.

15. A weighing machine comprising a beam having means to support articles to be weighed, a supply receptacle for material, a gate to control said supply, means to close the gate, an arm connected with the gate, a lever, means to urge the lever to operate the beam, a latch upon the lever, an arm to engage the latch and having catch means, another arm to engage said catch means and provided with catch means to control the first named arm.

16. A weighing machine comprising a weighing beam, a lever pivoted below the beam and operative to aid in tilting the latter, means to urge said lever toward the beam, a supply receptacle, a gate to control the flow of material therefrom, and means controlled in the closed position of the gate to render said lever inoperative with the beam.

17. A weighing machine comprising a weighing beam, a lever pivoted below the beam and operative to aid in tilting the latter, means to urge said lever toward the beam, a supply receptacle, a gate to control the flow of material therefrom, means controlled in the closed position of the gate to render said lever inoperative with the beam, and means controlled by the lever to retain the gate open when the beam is unbalanced by material to be weighed.

18. A weighing machine comprising a weighing beam, a lever pivoted below the beam and operative to aid in tilting the latter, means to urge said lever toward the beam, a supply receptacle, a gate to control the flow of material therefrom, means controlled in the closed position of the gate to render said lever inoperative with the beam, means controlled by the lever to retain the gate open when the beam is unbalanced by material to be weighed, and means to permit the beam to operate the lever to release the retaining means in the event of an overload of material upon the beam.

19. A weighing machine comprising a beam, a supply receptacle for articles to be weighed, a gate to control said supply, means to close the gate, an arm connected with the gate, a lever cooperative with the beam in one direction of movement, a plurality of arms, a latch upon the lever co-operative with one of said arms, another of said arms being provided with spaced projections for engagement by still another of said arms, the last named arm being provided with spaced projections for cooperation with the arm connected with said gate.

20. A weighing machine comprising a beam, a supply receptacle having a gate to control the flow therefrom, a hollow column supporting said receptacle, a shaft journaled in said column and carrying said gate, means to actuate the shaft to close the gate, a lever, said shaft having an arm, means cooperative between said arm and lever to retain the gate open, and means to cause movement of said lever with the beam to release said arm and gate.

21. A weighing machine comprising a beam, a supply receptacle having a gate to control the flow therefrom, a hollow column supporting said receptacle, a shaft journaled in said column and carrying said gate, means to actuate the shaft to close the gate, a lever, said shaft having an arm, said lever having a latch, an arm cooperative with said latch, cooperative arms between the first and last named arms, and means to cause movement of said lever with the beam to release said arms and gate.

Signed at New York city, in the county of New York and State of New York, this 4th day of December, A. D. 1920.

EARL B. ELDER.